United States Patent
Tsou et al.

(10) Patent No.: US 7,585,914 B2
(45) Date of Patent: Sep. 8, 2009

(54) THERMOPLASTIC ELASTOMER COMPOSITIONS AND METHODS FOR MAKING THE SAME

(75) Inventors: Andy Haishung Tsou, Houston, TX (US); David Yen-Lung Chung, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 632 days.

(21) Appl. No.: 11/270,364

(22) Filed: Nov. 9, 2005

(65) Prior Publication Data

US 2007/0106024 A1    May 10, 2007

(51) Int. Cl.
C08K 9/04 (2006.01)
C08L 47/00 (2006.01)

(52) U.S. Cl. .............. 524/514; 524/538; 525/132; 525/146; 525/150; 525/151; 525/153; 525/165; 525/178; 525/180; 525/186; 525/189; 525/206; 525/207; 525/238

(58) Field of Classification Search ........... 525/132, 525/146, 150, 151, 153, 165, 178, 180, 186, 525/189, 206, 207, 238; 524/514, 538
See application file for complete search history.

(56) References Cited

U.S. PATENT DOCUMENTS

| | | | |
|---|---|---|---|
| 3,037,954 A | 6/1962 | Gessler et al. | 260/29.8 |
| 3,948,868 A | 4/1976 | Powers | 260/80.7 |
| 4,130,534 A | 12/1978 | Coran et al. | 260/33.6 AQ |
| 4,172,859 A | 10/1979 | Epstein | 428/402 |
| 4,173,556 A | 11/1979 | Coran et al. | 260/30.8 R |
| 4,174,358 A | 11/1979 | Epstein | 525/183 |
| 4,197,379 A | 4/1980 | Coran et al. | 525/142 |
| 4,207,404 A | 6/1980 | Coran et al. | 525/184 |
| 4,226,953 A | 10/1980 | Coran et al. | 525/193 |
| 4,287,324 A | 9/1981 | Coran et al. | 525/408 |
| 4,297,453 A | 10/1981 | Coran et al. | 525/408 |
| 4,338,413 A | 7/1982 | Coran et al. | 525/179 |
| 4,348,502 A | 9/1982 | Coran et al. | 525/183 |
| 4,350,794 A | 9/1982 | Moncur | 525/183 |
| 4,419,499 A | 12/1983 | Coran et al. | 525/424 |
| 4,639,487 A | 1/1987 | Hazelton et al. | 524/425 |
| 4,779,657 A | 10/1988 | Cheung et al. | 152/510 |
| 5,910,544 A | 6/1999 | Ozawa et al. | 525/178 |
| 6,013,727 A | 1/2000 | Dharmarajan et al. | 525/72 |
| 6,062,283 A | 5/2000 | Watanabe et al. | 152/510 |
| 6,079,465 A | 6/2000 | Takeyama et al. | 152/510 |
| 6,334,919 B1 | 1/2002 | Takeyama et al. | 156/123 |
| 6,359,071 B1 | 3/2002 | Watanabe et al. | 525/184 |
| 6,397,912 B1 | 6/2002 | Watanabe et al. | 152/510 |
| 6,538,066 B2 | 3/2003 | Watanabe et al. | 525/184 |
| 6,861,470 B2 | 3/2005 | Watanabe et al. | 525/55 |
| 2003/0220454 A1 | 11/2003 | Kaszas | 525/331.9 |
| 2004/0132894 A1* | 7/2004 | Dias et al. | 524/515 |

FOREIGN PATENT DOCUMENTS

| | | |
|---|---|---|
| EP | 722850 B1 | 7/1996 |
| EP | 857761 A1 | 8/1998 |
| EP | 969039 A1 | 1/2000 |
| EP | 0 849 334 | 5/2003 |
| EP | 0 922 732 | 2/2004 |
| WO | WO 01/21672 | 3/2001 |
| WO | WO 02/100935 | 12/2002 |
| WO | WO03050149 | 6/2003 |
| WO | WO03050171 | 6/2003 |
| WO | WO03054032 | 7/2003 |

* cited by examiner

*Primary Examiner*—Ana L Woodward
(74) *Attorney, Agent, or Firm*—Nancy T. Krawczyk

(57) ABSTRACT

The present invention provides a thermoplastic composition which may be unvulcanized or vulcanized. The thermoplastic composition can be a blend of a thermoplastic engineering resin, a halogenated terpolymer of a $C_4$ to $C_7$ isomonoolefin, a para-alkylstyrene, and a multiolefin. The engineering resin can be a polyamide, such as nylon 6/66 copolymers for example. The isomonoolefin can be an isobutylene for example. The multiolefin can be a $C_4$ to $C_{14}$ diene, such as isoprene for example.

34 Claims, No Drawings

US 7,585,914 B2

THERMOPLASTIC ELASTOMER COMPOSITIONS AND METHODS FOR MAKING THE SAME

FIELD OF THE INVENTION

This invention relates to low-permeability thermoplastic compositions useful for air barriers, processes to produce the same, and their use in articles of manufacture.

BACKGROUND OF THE INVENTION

Thermoplastic olefins ("TPO") are polymer blends having a combination of both elastic and thermoplastic properties. They exhibit some of the properties of a cured elastomer as well as the reprocessability of thermoplastic resins. The elastomeric characteristics may be enhanced if one component of the blend is a vulcanizable elastomer which is wholly or partially crosslinked.

U.S. Pat. No. 4,130,534 discloses elastoplastic compositions comprising a blend of a thermoplastic crystalline polyolefin resin and a rubber which may be butyl rubber, chlorobutyl rubber or bromobutyl rubber. U.S. Pat. No. 4,639,487 discloses a heat shrinkable thermoplastic composition of an ethylene copolymer resin with a dynamically vulcanized halogenated butyl rubber. U.S. Pat. No. 6,013,727 discloses a blend of thermoplastic resin with a halogenated copolymer of a $C_4$ to $C_7$ isomonoolefin and a para-alkylstyrene.

U.S. Pat. No. 4,172,859 discloses a thermoplastic composition containing a polyamide matrix resin and at least one polymer having a specified tensile modulus. U.S. Pat. No. 4,174,358 discloses a thermoplastic composition containing a polyamide matrix resin and at least one polymer having a specified tensile modulus.

The earliest work in the curing of TPO compositions was by Gessler and Haslett, such as in U.S. Pat. No. 3,037,954, which teaches the concept of "dynamic curing," wherein a vulcanizable elastomer is dispersed into a resinous thermoplastic polymer and the elastomer cured while continuously mixing and shearing the polymer blend. The result is a microgel dispersion of cured rubber in an uncured matrix of resinous thermoplastic polymer. U.S. Pat. No. 3,037,954 discloses compositions comprising polypropylene and a rubber wherein the rubber may be, butyl rubber, chlorinated butyl rubber, polybutadiene, polychloroprene and polyisobutene. Compositions of about 50 to 95 parts polypropylene and about 5 to 50 parts of rubber are disclosed.

Dynamically vulcanized thermoplastic compositions comprising a polyamide and various types of elastomers are known. See, for example, U.S. Pat. No. 4,173,556; U.S. Pat. No. 4,197,379; U.S. Pat. No. 4,207,404; U.S. Pat. No. 4,297,453; U.S. Pat. No. 4,338,413; U.S. Pat. No. 4,348,502; and U.S. Pat. No. 4,419,499. U.S. Pat. No. 4,287,324 discloses a dynamically vulcanized composition comprising a blend of crystalline polyester and a cured epichlorohydrin. U.S. Pat. No. 4,226,953 discloses a dynamically vulcanized composition comprising a blend of styrene-acrylonitrile resin and a nitrile rubber. U.S. Pat. No. 4,350,794 discloses a polyamide molding and extrusion composition prepared by melt blending a polyamide resin and a polyamide reactive halogen functional elastomer.

EP722850B1 (and related U.S. Pat. No. 6,079,465, U.S. Pat. No. 6,334,919) disclose a low-permeability thermoplastic elastomer composition useful as a gas-barrier layer in pneumatic tires. The composition comprises a thermoplastic matrix, such as polyamides or blends of polyamides, in which a low-permeability rubber, such as brominated poly(isobutylene-co-paramethylstyrene) (BIMS) is dispersed. EP857761A1 (related US Patents include U.S. Pat. No. 5,910,544; U.S. Pat. No. 6,062,283; U.S. Pat. No. 6,397,912) and EP969039A1 (related US Patents include U.S. Pat. No. 6,359,071; U.S. Pat. No. 6,538,066; U.S. Pat. No. 6,861,470) limit the viscosity ratio between the thermoplastic matrix and the rubber dispersion to achieve phase continuity in thermoplastic and fine rubber dispersions. EP969039A1 also discusses the relationship between the rubber dispersions and durability of the thermoplastic elastomer composition.

There is still a need to improve the properties of uncured and of dynamically vulcanized alloys.

SUMMARY OF THE INVENTION

It has now been found that a thermoplastic engineering resin can be compatibilized with a halogenated isobutylene-based terpolymer to form a blend having fine rubber dispersion sizes in thermoplastics. The fine rubber dispersions can allow the thermoplastic matrix to be toughened, softened, and elastified for various applications that require materials of low permeability, high toughness, and good elasticity. Additionally, the reactivity of the allylic halide and benzylic halide, and unsaturation in the halogenated terpolymers can allow the usage of many functional compatibilizers that react with both the terpolymer and the thermoplastic matrix, thus leading to versatile vulcanization systems.

These compositions can have improved properties, such as higher Vicat softening temperature, lower oil absorption, resistance to compression set, and retention of properties after heat aging. Moreover, these compositions may be stabilized to ultraviolet light exposure without adversely affecting their properties. The compositions may also comprise uncured or dynamically cured elastomers.

The present invention provides a thermoplastic composition comprising: a thermoplastic engineering resin such as a polyamides, polyesters, polycarbonates, polysulfones, polyacetals, polylactones, acrylonitrile-butadiene-styrene resins, polyphenylene oxide, polyphenylene sulfide, styrene acrylonitrile resins, styrene-maleic anhydride resins, polyimides, aromatic polyketones, or mixtures thereof; and, a halogenated terpolymer comprising monomer units derived from a $C_4$ to $C_7$ isomonoolefin; a styrenic monomer; and, a multiolefin.

In some embodiments, the thermoplastic engineering resin can be a polyamide. In certain embodiments, the polyamide can be nylon 6, nylon 6,6, nylon 11, and mixtures thereof. In other embodiments, the polyamide can be a polyamide 6/66 copolymer.

In some embodiments, the isomonoolefin can be isobutylene, isobutene, 2-methyl-1-butene, 3-methyl-1-butene, 2-methyl-2-butene, 4-methyl-1-pentene, or mixtures thereof. In other embodiments, the styrenic monomer can be styrene, alpha-methylstyrene, or an alkylstyrene where the alkyl is selected from any $C_1$ to $C_5$ alkyl or branched chain alkyl. In certain embodiments, the styrenic monomer unit can be a para-alkylstyrene, such as para-methylstyrene for example.

In some embodiments, the multiolefin can be a $C_4$ to $C_{14}$ diene. In other embodiments, the multiolefin can be isoprene, butadiene, 2,3-dimethyl-1,3-butadiene, myrcene, 6,6-dimethyl-fulvene, hexadiene, cyclopentadiene, methylcyclopentadiene, piperylene, divinylbenzene or mixtures thereof.

In some embodiments, the terpolymer can be halogenated with bromine, chlorine, or mixtures thereof. The halogen can be chemically bound to the para-methylstyrene. In other embodiments, the isomonoolefin can be isobutylene, the multiolefin can be isoprene, and the styrenic monomer can be para-methylstyrene.

The composition can include a filler, a rubber compounding additive, rubber processing oils, plasticizers, and mixtures thereof. The composition can be a vulcanized composition, or can be a non-vulcanized composition.

The present invention also provides a process for preparing a thermoplastic composition including the steps of blending a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene acrylonitrile resins, styrene-maleic anhydride resins, polyimides, aromatic polyketones, and mixtures thereof; and, an unvulcanized halogenated terpolymer comprising monomer units derived from: a $C_4$ to $C_7$ isomonoolefin; a styrenic monomer; and, a multiolefin; and, a vulcanizing agent for the elastomeric halogenated terpolymer; and masticating and shearing the blend at vulcanization conditions for a time sufficient to produce a vulcanized thermoplastic composition.

In some embodiments, the method can include blending a component selected from the group consisting of a filler, a rubber compounding additive, and mixtures thereof. In other embodiments, the method can include blending a component selected from the group consisting of rubber processing oils, plasticizers, and mixtures thereof.

DETAILED DESCRIPTION

The thermoplastic composition of the present invention comprises a blend of a thermoplastic engineering resin, and terpolymer of a $C_{4-8}$ isoolefin, a multiolefin, and a styrenic monomer. The thermoplastic composition may be an unvulcanized composition, or may be statically vulcanized, or may have been subjected to dynamic vulcanization. The composition can have improved air barrier properties and can be used as an innerliner or innertube.

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to the major elastomer or polymer component, based upon 100 parts by weight of the polymer(s), elastomer(s) or rubber(s).

The term "polymer blend" is used herein to denote the blend of one or more thermoplastic engineering resins, the elastomeric halogen-containing copolymer and any other polymers (elastomer or non-elastomer) that may be a component of the composition. Optionally, additional elastomers and/or non-elastomeric polymers may be included in the composition of the present invention.

As used herein, "isobutylene based elastomer" or "isobutylene based polymer" refers to elastomers or polymers comprising at least 70 mole percent repeat units from isobutylene.

As used herein, "isomonoolefin" refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent).

As used herein, "hydrocarbon" refers to molecules or segments of molecules containing primarily hydrogen and carbon atoms. In some embodiments, hydrocarbon also includes halogenated versions of hydrocarbons and versions containing heteroatoms.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

In the embodiment of the invention in which it is desired to obtain dynamically vulcanized alloys (DVA's) the alloys are generally prepared by blending together at least one engineering resin and at least one elastomer with curatives and fillers under conditions of dynamic vulcanization.

In preparing the preferred dynamically vulcanized composition of the present invention, at least a portion of one thermoplastic engineering resin is blended with the elastomeric halogen-containing copolymer.

Thermoplastic Engineering Resin

The thermoplastic engineering resins suitable for practice of the present invention may be used singly or in combination and are resins containing nitrogen, oxygen, halogen, sulfur or other groups capable of interacting with an aromatic haloalkyl group. Suitable engineering resins include resins selected from the group consisting of polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK) and mixtures thereof. Preferred thermoplastic engineering resins are polyamides. Preferred polyamides are nylon 6, nylon 66, nylon 6/66, and nylon 11.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6), poly-hexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Nylon 6/66 copolymers are preferred in other embodiments. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention, with linear crystalline polyamides having a softening point or melting point between 160-230° C. being preferred.

Suitable thermoplastic polyesters comprise linear, crystalline, high molecular weight solid polymers having recurring

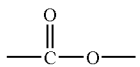

groups, including

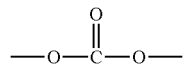

groups within the polymer chain. The term "linear" as used herein in respect to polyester means a polymer in which the recurring ester groups are within the polymer backbone and not pendant from the polymer backbone.

Linear crystalline polyesters having a softening point above about 50° C. are satisfactory, with polyesters having a softening point or melting point above 100° C. being preferred, with polyesters having a softening point or melting point between 160-260° C. being more preferred. Saturated linear polyesters (free of olefinic unsaturation) are preferred, however, unsaturated polyesters may be used provided that the rubber, if cross-linked, is cross-linked prior to blending with the polyester or provided that the rubber is dynamically cross-linked with a cross-linking agent that will not significantly induce cross-link formation in the polyester. Cross-linked polyesters are unsatisfactory for the practice of this invention. If significant cross-link formation of the polyester is permitted to occur, the resulting composition is not thermoplastic.

Many commercially available thermoplastic linear crystalline polyesters may be advantageously employed in the practice of the invention or they may be prepared by polymerization of one or more dicarboxylic acids, anhydrides or esters and one or more diol. Examples of satisfactory polyesters include poly(trans-1,4-cyclohexylene $C_{2-6}$ alkane dicarboxylates) such as poly(trans-1,4-cyclohexylene succinate) and poly(trans-1,4-cyclohexylene adipate), poly(cis or trans-1,4-cyclohexanedimethylene) $C_{0-2}$ alkanedicarboxylates such as poly(cis 1,4-cyclohexane-di-methylene)oxalate and poly-(cis 1,4-cyclohexane-di-methylene)succinate, poly($C_{2-4}$ alkylene terephthalates) such as polyethyleneterephthalate and polytetramethylene-terephthalate, poly($C_{2-4}$ alkylene terephthalates) such as polyethyleneterephthalate and polytetramethylene-terephthalate, poly($C_{2-4}$ alkylene isophthalates) such as polyethyleneisophthalate and polytetramethylene-isophthalate, poly(p-phenylene $C_{1-3}$ alkanedicarboxylates) such as poly(p-phenylene glutarate) and poly(p-phenylene adipate), poly(p-xylene oxalate), poly(oxylene oxalate), poly(p-phenylenedi-$C_{1-5}$ alkylene terephthalates) such as poly(p-phenylenedimethylene terephthalate) and poly(p-phenylene-di-1,4-butylene terephthalate, poly-($C_{2-10}$ alkylene 1,2-ethylenedioxy-4,4-dibenzoates) such as poly(ethylene-1,2-ethylenedioxy-4,4-dibenzoates), poly-(tetramethylene-1,2-ethylenedioxy-4,4-dibenzoate) and poly-(hexamethylene-1,2-ethylene-dioxy-4,4-dibenzoate), poly($C_{3-10}$ alkylene-4,4-dibenzoates) such as poly(pentamethylene-4,4-dibenzoate), poly(hexamethylene-4,4-dibenzoate and poly(decamethylene-4,4-dibenzoate), poly($C_{2-10}$ alkylene-2,6-naphthalene dicarboxylates) such as poly-(ethylene-2,6-naphthalene dicarboxylates) poly(trimethylene-26-naphthalene dicarboxylates) and poly(tetramethylene-2,6-naphthalene dicarboxylates), and poly-($C_{2-10}$ alkylene sulfonyl-4,4-dibenzoates) such as poly(octamethylene sulfonyl-4,4-dibenzoate) and poly(decamethylene sulfonyl-4,4-dibenzoate. Additional examples of satisfactory linear polyesters are described in Encyclopedia of Polymer Science and Technology, Vol. 11, pages 68-73 and Korshak & Vinogradova Polyesters, Pergamon Press, pages 31-64. Suitable polycarbonates are also commercially available. For suitable segmented poly(ether-co-phthalates) see page 46, Rubber World Blue Book, supra. Polylactones such as polycaprolactone are satisfactory in the practice of the invention. Preferred polyesters of the invention are derived from aromatic dicarboxylic acids such as naphthalenic or phthalic acids. More preferred polyesters are poly(alkylene terephthalates) especially polytetramethylene terephthalate), or mixed polyphthalates derived from two or more glycols, two or more phthalic acids, or two or more glycols and two or more phthalic acids such as poly(alkylene terecoisophthalates).

Optionally, other thermoplastic polymers, such as polyolefin resins may be included in the polymer blend, such as, for example, PP, HDPE, LDPE, LLDPE, EVA, EMA, etc.

Halogenated Terpolymer Elastomer

The composition of the present invention includes a terpolymer comprising $C_4$ to $C_7$ isomonoolefin derived units. The isomonoolefin can be a $C_4$ to $C_7$ compound, in one embodiment selected from isobutylene, isobutene, 2-methyl-1-butene, 3-methyl-1-butene, 2-methyl-2-butene, and 4-methyl-1-pentene. The terpolymer may also include other monomer derived units. In one embodiment, the terpolymer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the terpolymer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, and piperylene.

In one embodiment, the terpolymer includes an isomonoolefin derived unit, a multiolefin derived unit, and a styrenic derived unit. For example, isobutylene based terpolymers including styrenic and multiolefin derived units can be prepared, such as by the processes as disclosed in U.S. Pat. No. 3,948,868, U.S. Pat. No. 4,779,657, and WO2001/021672 (and corresponding EP1228106; US20030220454A1), and subsequently halogenated to form the halogenated terpolymer of the present invention.

In one embodiment, elastomeric random terpolymers of isobutylene, para-methylstyrene, and isoprene can contain from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. In other embodiments, the functionality can be selected such that it can react or form polar bonds with functional groups present in the matrix polymer, for example, acid, amino or hydroxyl functional groups, when the polymer components are mixed at high temperatures. Flesh out based on prior art patents.

These functionalized terpolymers have a substantially homogeneous compositional distribution such that at least 95% by weight of the polymer has a para-alkylstyrene content within 10% of the average para-alkylstyrene content of the terpolymer. Desirable interpolymers are also characterized by a narrow molecular weight distribution ($M_w/M_n$) of less than 5, more preferably less than 3, a preferred viscosity average molecular weight in the range of from 200,000 up to 2,000,000 and a preferred number average molecular weight in the range of from 25,000 to 750,000 as determined by gel permeation chromatography.

Various methods may be used to produce the terpolymers of isomonoolefin, multiolefin, and para-alkylstyrene. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvents prior to introducing monomers and catalysts.

Reactors which are typically used in butyl rubber polymerization are generally suitable for use in a polymerization reaction to produce the desired terpolymers suitable for use in the process of the present invention. The polymerization temperature may range from about minus 35° C. to about minus 100° C., preferably from about minus 40 to about minus 95° C.

The processes for producing the terpolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt percent of polymer are possible.

The terpolymers of isomonoolefins, multiolefins, and para-alkylstyrene may be produced by admixing the isomonoolefin, the multiolefin, and the para-alkylstyrene in a polymerization reactor under polymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the terpolymer is the exclusion of impurities from the polymerization reactor, namely, impurities which, if present, will result in catalyst poisoning or excessive molecular weight depression by complexing with the catalyst or copolymerization with the isomonoolefins, multiolefins, or the para-alkylstyrene, which in turn will prevent one from efficiently producing the terpolymer product useful in the practice of the present invention. Most particularly, these impurities include catalyst poisoning materials, such as, for example, moisture and the like and other copolymerizable monomers, such as, for example, meta-alkylstyrenes and the like. These impurities should be kept out of the system.

In producing the terpolymers, it is preferred that the para-alkylstyrene be at least 95.0 wt percent pure, preferably 97.5 wt percent pure, most preferably 99.5 wt percent pure, and that the multiolefin be at least 95.0 wt percent pure, preferably 97.5 wt percent pure, most preferably 99.5 wt percent pure. It is preferred that the isomonoolefin be at least 99.5 wt percent pure, preferably at least 99.8 wt percent pure, and that the diluents employed be at least 99 wt percent pure, and preferably at least 99.8 wt percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt percent and preferably from about 0.01 to 0.2 wt percent, based upon the total amount of monomer to be polymerized.

The terpolymers can be prepared by reacting a monomer mixture, the mixture having at least (1) a $C_4$ to $C_7$ isomonoolefin monomer component such as isobutylene with (2) a multiolefin, or conjugated diene, monomer component, and (3) a styrenic monomer component. The isomonoolefin is in a range from 70 to 99.5 weight percent by weight of the total comonomer mixture in one embodiment, and 85 to 99.5 weight percent in another embodiment. The conjugated diene component in one embodiment is present in the monomer mixture from 30 to 0.5 weight percent in one embodiment, and from 15 to 0.5 weight percent in another embodiment. In yet another embodiment, from 8 to 0.5 weight percent of the monomer mixture is conjugated diene. The styrenic monomer component in one embodiment is present in the monomer mixture from 30 to 0.5 weight percent in one embodiment, and from 15 to 0.5 weight percent in another embodiment. In yet another embodiment, from 12 to 0.5 weight percent of the monomer mixture is styrenic monomer.

The isomonoolefin can be a $C_4$ to $C_7$ compound such as isobutylene, isobutene 2-methyl-1-butene, 3-methyl-1-butene, 2-methyl-2-butene, and 4-methyl-1-pentene. The multiolefin can be a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the terpolymer of the invention is obtained by reacting 80 to 99 weight percent of isobutylene with 0.5 to 8 weight percent isoprene and 0.5 to 12 weight percent para-methylstyrene, or reacting 90 to 99 weight percent isobutylene with from 0.5 to 5.0 weight percent isoprene and 0.5 to 9.5 weight percent para-methylstyrene in yet another embodiment.

The halogenated terpolymer can be produced by the halogenation of the terpolymer described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, Rubber Technology at 298-299 (1995). In one embodiment, the terpolymer is halogenated in hexane diluent at from 40 to 60° C. using bromine ($Br_2$) or chlorine ($Cl_2$) as the halogenation agent. The halogenated terpolymer can have a Mooney Viscosity of from 20 to 70 (ML 1+8 at 125° C.) in one embodiment, and from 25 to 55 in another embodiment. The halogen content can be from 0.1 to 10 weight percent based on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated terpolymer can be a butyl or star-branched butyl rubber halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. No. 4,632,963; U.S. Pat. No. 4,649,178; U.S. Pat. No. 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the following structure, wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment:

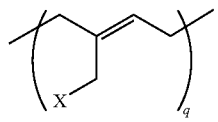

The halogenated terpolymers in one embodiment of the invention are random elastomeric terpolymers of a $C_{4-7}$ isoolefin (such as isobutylene), a para-alkylstyrene monomer (preferably para-methylstyrene containing at least 80%, more preferably at least 90% by weight of the para-isomer), and a $C_{4-14}$ multiolefin (such as isoprene, butadiene, 2,3-dimethyl-1,3-butadiene, myrcene, 6,6-dimethyl-fulvene, hexadiene, cyclopentadiene, methylcyclopentadiene, and piperylene). The terpolymer may be characterized as containing the following monomer units randomly spaced along the polymer chain:

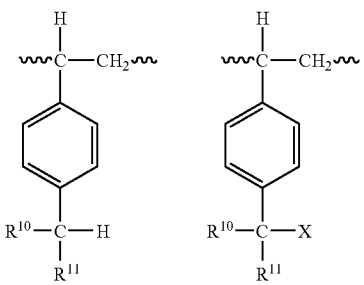

wherein R10 and R11 are independently hydrogen, lower alkyl, preferably C1 to C7 alkyl and primary or secondary alkyl halides and X is a functional group such as halogen. Preferably R10 and R11 are hydrogen. Up to 60 mole percent of the para-substituted styrene present in the interpolymer structure may be the functionalized structure (5) above in one embodiment, and in another embodiment from 0.1 to 5 mole percent. In yet another embodiment, the amount of functionalized structure (5) is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof.

The halogenated terpolymer component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in Rubber Technology 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in Rubber Technology 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in The Vanderbilt Rubber Handbook 105-122 (Robert F. Ohm ed., R. T. Vanderbilt Co., Inc. 1990), and in Rubber Technology 311-321 (1995). Butyl rubbers, halogenated butyl rubbers, and star-branched butyl rubbers are described by Edward Kresge and H. C. Wang in 8 Kirk-Othmer Encyclopedia of Chemical Technology 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos 5,162,445; U.S. Pat. No. 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Curatives and Other Additives

The composition of the invention may also include one or more filler components such as calcium carbonate, clay, mica, silica and silicates, talc, titanium dioxide, and carbon black. In one embodiment, the filler is carbon black or modified carbon black. The preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbanate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the composition. This ratio can vary from about 0.3/1 to about 1.3/1; preferably about 0.5/1 to about 1.2/1; more preferably about 0.8/1 to about 1.1/1. Oils other than petroleum based oils such as oils derived from coal tar and pine tar can be utilized. In addition to the petroleum derived rubber process oils, organic esters and other synthetic plasticizers can be used. As used herein, the term "process oil" means both the petroleum derived process oils and synthetic plasticizers.

The process oil may be included in the composition to insure that the composition has good flow properties. The quantity of oil utilized will depend in part on the amount of polymer blend and filler used as well as, to some extent, the type of cure system utilized. Generally, the process oil, when included, may comprise about 30 wt percent of the composition. Larger amounts of process oil can be used, the deficit being reduced physical strength.

Antioxidants may be utilized in the composition of this invention to enhance further the improved aging properties of the elastomeric copolymers component of the present invention and to protect the engineering resins. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Nonlimiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

Blend Processing

The composition of the present invention can be formed by a polymer melt blending process. Blending of the components can be carried out by combining the polymer components in any suitable mixing device such as a Banbury™ mixer, Brabender™ mixer or preferably a mixer/extruder and mixing at temperatures in the range of 120° C. up to 400° C. under conditions of shear sufficient to allow the terpolymer to become uniformly dispersed within the plastic engineering resin.

The composition of the present invention can also be formed by solution blending. In certain embodiments, the composition is produced by a process comprising contacting Solution A comprising a solvent comprising a hydrocarbon and at least one terpolymer with Solution B comprising a solvent and at least one engineering resin, and removing the solvents from the contact product of Solution A and Solution B to form the composite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

In the compositions of the present invention, the thermoplastic engineering resin(s) may suitably be present in an amount ranging from about 10 to 98 weight percent, preferably from about 20 to 95 weight percent, the elastomeric halogen-containing copolymer of an isomonoolefin and a para-alkylstyrene may be present in an amount ranging from about 2 to 90 weight percent, preferably from about 5 to 80 weight percent, based on the polymer blend.

The secant flexural modulus of the thermoplastic compositions may range from about 100 $kg/cm^2$ to about 400,000 $kg/cm^2$, preferably from about 200 $kg/cm^2$ to about 100,000 $kg/cm^2$ measured according to ASTM D790 at 1% strain.

The polymer blend may comprise about 25 to about 98 wt percent of the overall composition. In addition to its polymer components, the composition of the present invention may comprise fillers, and additives such as antioxidants, stabilizers, rubber processing oils lubricants (e.g., oleamide), anti-blocking agents, waxes, foaming agents, flame retardants, pigments, coupling agents for the fillers and other processing aids known to the rubber compounding art. Metal oxides, e.g., MgO, can be included to act as acid acceptors. The pigments and fillers may comprise up to 30 wt percent of the total composition based on polymer components plus additives. Preferably, the pigments and fillers comprise about 1 to about 30 wt percent based on the composition, more preferably about 2 to about 20 weight percent of the overall composition.

It is within the scope of this invention to incorporate a secondary or an uncured rubber in combination with a dynamically vulcanized rubber in the composition. This can be accomplished by selecting as the uncured rubber a rubber which cannot be vulcanized by the vulcanizing agent used to cure the elastomeric halogenated copolymer component of the present invention which is to be dynamically vulcanized or by adding to the dynamically vulcanized thermoplastic composition, after the vulcanization agent has been fully consumed, a rubber which is vulcanizable by the vulcanization agent used to vulcanize the elastomeric halogenated copolymer component of the present invention. For example, when the elastomeric halogenated component of the present invention is vulcanized with a cure system which comprises zinc oxide, any other rubber which requires sulfur or another curative to vulcanize it or which is not vulcanizable can be included. Such rubbers include ethylene-propylene polymers (EPM), ethylene-propylene-diene polymers (EPDM), polyisobutylene, natural rubber, etc. Alternatively, the DVA can be prepared first from the resin and vulcanizable elastomer by dynamic vulcanization and subsequently, an uncured rubber can be blended into the DVA at a temperature above the melting point of the thermoplastic resin. In the embodiment in which an uncured rubber is incorporated in the dynamically vulcanized composition, the uncured rubber may be present in an amount ranging from above zero to about 25, preferably from about 5 to about 20 weight percent of the total rubber (i.e., elastomer) content of the composition.

When it is desired to produce a vulcanized composition, any conventional curative system which is capable of vulcanizing saturated halogenated polymers may be used to vulcanize at least the elastomeric halogenated terpolymer of a $C_4$ to $C_7$ isomonoolefin, a multiolefin, and a para-alkylstyrene, except that peroxide curatives are specifically excluded from the practice of this invention when the thermoplastic engineering resins chosen as components are such that peroxide would cause these thermoplastic resins themselves to crosslink. Furthermore, any curative which would cause the particular engineering resin being used to crosslink under the processing conditions being used to prepare the dynamically vulcanized alloy should be excluded from the curative system used. Suitable curative systems for the elastomeric halogenated terpolymer component of the present invention include zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5-triazine), ZDEDC (zinc diethyl dithiocarbamate) and other dithiocarbamates, Tetrone A (di-penta-methylene thiuram hexasulfide), Vultac-5 (alkylated phenol disulfide), SP 1045 (phenol formaldehyde resin), SP 1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The vulcanization can be conducted at conditions to vulcanize at least partially, preferably fully, the halogenated elastomeric copolymer.

In the practice of this invention, the engineering resin, the elastomeric terpolymer and optional other polymers can be mixed together at a temperature sufficient to soften the resin or, more commonly, at a temperature above its melting point when the resin is crystalline at room temperature. If the mixture is to be dynamically vulcanized, after the resin and other polymers have been intimately mixed, the curative or curatives are added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the matrix resin to about 300° C.; more typically, the temperature may range from about the melting point of the matrix resin to about 275° C. Preferably the vulcanization is carried out at a temperature range from about the flux temperature of the polymer blend to about 20° C. above the softening or melting temperature of the matrix resin. It is preferred that the mixing process be continued until the desired level of vulcanization is completed. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the elastomer to be cured can be dynamically vulcanized in the presence of a portion or all of the engineering resin. This blend can then be let down into additional engineering resin. Similarly, it is not necessary to add all of the fillers and oil prior to dynamic vulcanization. A portion or all of the additives, fillers and oil can be added during or after the vulcanization is completed. Certain ingredients, such as stabilizers and process aids function more effectively if they are added after curing.

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the lower the extractables of the cured rubber components, the better the properties; and still more preferably are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that of any rubber component, if optionally present, of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, with an appropriate solvent for the resin being used.

The cross-link density of the rubber is determined by equilibrium solvent swelling using the Flory-Rehner equation, as shown in J. Rubber Chem. and Tech. 30, p. 929. The appropriate Huggins solubility parameters for rubber solvent pairs used in the calculation were obtained from the review article by Sheehan and Bisio, J. Rubber Chem. & Tech. 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises nylon as the thermoplastic engineering resin, and a brominated terpolymer of isobutylene, isoprene, and a para-methylstyrene.

For certain jurisdictions, embodiments of the invention also provide for the following:

1. A thermoplastic composition comprising:
    a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene acrylonitrile resins, styrene-maleic anhydride resins, polyimides, aromatic polyketones, and mixtures thereof; and
    at least partially dispersed therein a halogenated terpolymer comprising monomer units derived from
    a $C_4$ to $C_7$ isomonoolefin;
    a styrenic monomer; and,
    a multiolefin.
2. The composition of claim 1 wherein the thermoplastic engineering resin is a polyamide.
3. The composition of claim 2 wherein the polyamide is selected from the group consisting of nylon 6, nylon 6,6, nylon 11, and mixtures thereof.
4. The composition of claim 2 or 3 wherein the polyamide is a polyamide 6/66 copolymer.
5. The composition of any one of claims 1 to 4 wherein the isomonoolefin is isobutylene, isobutene, 2-methyl-1-butene, 3-methyl-1-butene, 2-methyl-2-butene, 4-methyl-1-pentene, or mixtures thereof.
6. The composition of any one of claims 1 to 4 wherein the isomonoolefin is isobutylene.
7. The composition of any one of claims 1 to 6 wherein the styrenic monomer is styrene, alpha-methylstyrene, or an alkylstyrene where the alkyl is selected from any $C_1$ to $C_5$ alkyl or branched chain alkyl.
8. The composition of any one of claims 1 to 6 wherein the styrenic monomer unit is a para-alkylstyrene.
9. The composition of claim 8 wherein the para-alkylstyrene is para-methylstyrene.
10. The composition of any one of claims 1 to 9 wherein the multiolefin is a $C_4$ to $C_{14}$ diene.
11. The composition of any one of claims 1 to 9 wherein the multiolefin is selected from the group consisting of isoprene, butadiene, 2,3,-dimethyl-1,3-butadiene, myrcene, 6,6-dimethyl-fulvene, hexadiene, cyclopentadiene, methylcyclopentadiene, piperylene, divinylbenzene and mixtures thereof.
12. The composition of any one of claims 1 to 11 wherein the terpolymer is halogenated with bromine, chlorine, or mixtures thereof.
13. The composition of any one of claims 1 to 12 wherein the isomonoolefin is isobutylene, the multiolefin is isoprene, and the styrenic monomer is para-methylstyrene.
14. The composition of claim 13 wherein the halogen is chemically bound to the para-methylstyrene.
15. The composition of any one of claims 1 to 14 comprising a component selected from the group consisting of a filler, a rubber compounding additive, and mixtures thereof.
16. The composition of any one of claims 1 to 15 comprising a component selected from the group consisting of rubber processing oils, plasticizers, and mixtures thereof.
17. The composition of any one of claims 1 to 16 wherein the composition is a vulcanized composition.
18. The composition of any one of claims 1 to 16 wherein the composition is a non-vulcanized composition.
19. A method for preparing the thermoplastic composition of claim 17, comprising blending:
    the thermoplastic engineering resin;
    the halogenated terpolymer; and,
    a vulcanizing agent for the halogenated terpolymer; and
    masticating and shearing the blend at vulcanization conditions for a time sufficient to produce a vulcanized thermoplastic composition.
20. The method of claim 19 comprising blending a component selected from the group consisting of a filler, a rubber compounding additive, and mixtures thereof.
21. The method of claim 19 or 20 comprising blending a component selected from the group consisting of rubber processing oils, plasticizers, and mixtures thereof.

Permeability Testing

For each of the following examples, the compositions formed were analyzed for permeability properties using the following method. In certain embodiments, polymer blends were prepared in a Brabender® mixer at a temperature of 220° C. and at 60 rpm for 5 minutes. Nylon was added first, with elastomer being added 1 minute after. The resulting blends were compression molded at 220° C. All specimens were compression molded with slow cooling to provide defect free pads. Typical thickness of a compression molded pad is around 0.3 to 0.4 mm using an Arbor press, 2" diameter disks were then punched out from molded pads for permeability testing. These disks were conditioned in a vacuum oven at 60° C. overnight prior to the measurement. The oxygen permeation measurements were done using a Mocon™ OX-TRAN 2/61 permeability tester at 60° C. under the principle of R. A. Pasternak et. al. in 8 JOURNAL OF POLYMER SCIENCE: PART A-2 467 (1970). Disks thus prepared were mounted on a template and sealed with a vacuum grease. Ten psi nitrogen was kept on one side of the disk, whereas the other side was 10 psi oxygen. Using the oxygen sensor on the nitrogen side, increase in oxygen concentration on the nitrogen side with time was monitored. The time required for oxygen to permeate through the disk or for the oxygen concentration on the nitrogen side to reach a constant value was recorded and used to determine the oxygen permeability. Permeability was measured as oxygen transmission rate on a Mocon™ WX-TRAN 2/61 at 60° C.

EXAMPLE

Comparative Example 1 is a blend of Nylon 6/66 (Ube 5033B; a nylon 6/66 copolymer having approximately 25% nylon 66 and a tensile strength of about 65 MPa) with a copolymer of isobutylene and para-methylstyrene (XP50, ~10 weight percent para-methylstyrene; not brominated). Comparative Example 2 is a blend of Nylon 6/66 (Ube 5033B) with a brominated copolymer of isobutylene and para-methylstyrene (EXXPRO™ 89-4; ~0.75 mole percent bromine, ~5 weight percent para-methylstyrene).

A terpolymer of isobutylene, isoprene, and para-methylstyrene was synthesized in the laboratory and subsequently brominated by photo-radicals. The polymerization was conducted at −90° C. in methyl chloride solvent containing 12 wt % monomers (88 wt % isobutylene, 2 wt % isoprene, and 10 wt % para-methylstyrene) and 0.2 wt % of an ethylaluminum dichloride and hydrochloride catalyst solution having an ethylaluminum dichloride to hydrochloride catalyst ratio of 3:1. The resulting polymer was precipitated using methanol, recovered and dried, and re-dissolved in cyclohexane where the polymer was brominated by free radical bromination. The resulting polymer had a number average molecular weight of approximately 57,000, a weight average molecular weight of approximately 252,000, and a molecular weight distribution of 4.4. Proton-NMR composition analysis indicated the terpolymer had 0.48 mole percent isoprene, 4.56 mole percent para-methylstyrene, and a final bromine content of 0.5 mole percent, distributed among 0.3 mole percent brominated para-methylstyrene and 0.2 mole percent brominated isoprene. The synthesized halogenated terpolymer was blended with Nylon 6/66 (Ube 5033B), and is compared to Comparative Examples 1 and 2 in Table 1 below.

Each of the polymer blends of Table 1 were prepared by mixing the respective components in a Brabender™ mixer at 220 C at 60 rpm for 5 minutes. The blended polymer compositions had the resulting morphology and properties as listed in Table 1.

TABLE 1

Permeation results for Examples 1-12.

|  | Comparative Example 1 | Comparative Example 2 | Example 1 |
|---|---|---|---|
| Composition (wt %) | | | |
| Nylon 6/66 | 60 | 60 | 60 |
| XP-50 | 40 | 0 | 0 |
| Exxpro ™ 89-4 (BIMS) | 0 | 40 | 0 |
| Br (IB-IP-PMS) | 0 | 0 | 40 |
| Morphology | | | |
| Tapping AFM | Poor | Excellent (fine) | Excellent (fine) |
| Properties | | | |
| G' (−20° C.) (MPa) | NM* | 413 | 296 |
| G' (0° C.) (MPa) | NM* | 405 | 289 |
| G' (20° C.) (MPa) | NM* | 395 | 283 |
| Loss Tangent (−20° C.) | NM* | 0.024 | 0.045 |
| Loss Tangent (0° C.) | NM* | 0.017 | 0.023 |
| Loss Tangent (20° C.) | NM* | 0.018 | 0.022 |
| Permeability ($\mu$m-cc/m$^2$-day-kPa) | NM* | 251 | 240 |

*NM = not measured; due to the poor blend morphology, the sample cannot be molded into a good quality film for mechanical and permeability measurements.

Embodiments of the composition of the present invention are useful as air barriers, such as used in producing innerliners for motor vehicles. In particular, the nanocomposites are useful in innerliners and innertubes for articles such as truck tires, bus tires, passenger automobile, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. A dynamically vulcanized thermoplastic composition comprising:
   a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene acrylonitrile resins, styrene-maleic anhydride resins, polyimides, aromatic polyketones, and mixtures thereof; and
   at least partially dispersed therein a halogenated terpolymer comprising monomer units derived from
   a $C_4$ to $C_7$ isomonoolefin;
   a styrenic monomer; and,
   a multiolefin.

2. The composition of claim 1 wherein the thermoplastic engineering resin is a polyamide.

3. The composition of claim 2 wherein the polyamide is selected from the group consisting of nylon 6, nylon 6,6, nylon 11, and mixtures thereof.

4. The composition of claim 2 wherein the polyamide is a polyamide 6/66 copolymer.

5. The composition of claim 1 wherein the isomonoolefin is isobutylene, isobutene, 2-methyl-1-butene, 3-methyl-1-butene, 2-methyl-2-butene, 4-methyl-1-pentene, or mixtures thereof.

6. The composition of claim 1 wherein the isomonoolefin is isobutylene.

7. The composition of claim 1 wherein the styrenic monomer is styrene, alpha-methylstyrene, or an alkylstyrene where the alkyl is selected from any $C_1$ to $C_5$ alkyl or branched chain alkyl.

8. The composition of claim 1 wherein the styrenic monomer unit is a para-alkylstyrene.

9. The composition of claim 8 wherein the para-alkylstyrene is para-methylstyrene.

10. The composition of claim 1 wherein the multiolefin is a $C_4$ to $C_{14}$ diene.

11. The composition of claim 1 wherein the multiolefin is selected from the group consisting of isoprene, butadiene, 2,3,-dimethyl-1,3-butadiene, myrcene, 6,6-dimethyl-fulvene, hexadiene, cyclopentadiene, methylcyclopentadiene, piperylene, divinylbenzene and mixtures thereof.

12. The composition of claim 1 wherein the terpolymer is halogenated with bromine, chlorine, or mixtures thereof.

13. The composition of claim 1 wherein the isomonoolefin is isobutylene, the multiolefin is isoprene, and the styrenic monomer is para-methylstyrene.

14. The composition of claim 13 wherein the halogen is chemically bound to the para-methylstyrene.

15. The composition of claim 1 comprising a component selected from the group consisting of a filler, a rubber compounding additive, and mixtures thereof 16. The composition of claim 1 comprising a component selected from the group consisting of rubber processing oils, plasticizers, and mixtures thereof.

17. The composition of claim 1 wherein the dynamically vulcanized thermoplastic composition has a storage modulus, G', at −20° C., of not more than 296, a storage modulus, G', at 0° C of not more than 289.

18. A method for preparing a thermoplastic composition, comprising blending:
 a thermoplastic engineering resin selected from the group consisting of polyamides, polyesters, polycarbonates, polysulfones, polyacetals, polylactones, acrylonitrile-butadiene-styrene resins, polyphenylene oxide, polyphenylene sulfide, styrene acrylonitrile resins, styrene-maleic anhydride resins, polyimides, aromatic polyketones, and mixtures thereof and
 an unvulcanized halogenated terpolymer comprising monomer units derived from:
 a $C_4$ to $C_7$ isomonoolefin;
 a styrenic monomer; and,
 a multiolefin; and,
 a vulcanizing agent for the elastomeric halogenated terpolymer; and
 masticating and shearing the blend at vulcanization conditions for a time sufficient to produce a dynamically vulcanized thermoplastic composition.

19. The method of claim 18 wherein the thermoplastic engineering resin is a polyamide.

20. The method of claim 19 wherein the polyamide is selected from the group consisting of nylon 6, nylon 6,6, nylon 11, and mixtures thereof.

21. The method of claim 19 wherein the polyamide is a polyamide 6/66 copolymer.

22. The method of claim 18 wherein the isomonoolefin is isobutylene, isobutene, 2-methyl-1-butene, 3-methyl-1-butene, 2-methyl-2-butene, 4-methyl-1-pentene, or mixtures thereof.

23. The method of claim 18 wherein the isomonoolefin is isobutylene.

24. The method of claim 18 wherein the styrenic monomer is styrene, alpha-methylstyrene, or an alkylstyrene where the alkyl is selected from any $C_1$ to $C_5$ alkyl or branched chain alkyl.

25. The method of claim 18 wherein the styrenic monomer unit is a para-alkylstyrene.

26. The method of claim 25 wherein the para-alkylstyrene is para-methylstyrene.

27. The method of claim 18 wherein the multiolefin is a $C_4$ to $C_{14}$ diene.

28. The method of claim 18 wherein the multiolefin is selected from the group consisting of isoprene, butadiene, 2,3,-dimethyl-1,3-butadiene, myrcene, 6,6-dimethyl-fulvene, hexadiene, cyclopentadiene, methylcyclopentadiene, piperylene, divinylbenzene and mixtures thereof.

29. The method of claim 18 wherein the terpolymer is halogenated with bromine, chlorine, or mixtures thereof.

30. The method of claim 18 wherein the isomonoolefin is isobutylene, the multiolefin is isoprene, and the styrenic monomer is para-methylstyrene.

31. The method of claim 30 wherein the halogen is chemically bound to the para-methylstyrene.

32. The method of claim 18 comprising blending a component selected from the group consisting of a filler, a rubber compounding additive, and mixtures thereof.

33. The method of claim 18 comprising blending a component selected from the group consisting of rubber processing oils, plasticizers, and mixtures thereof.

34. The method of claim 18, wherein the dynamically vulcanized thermoplastic composition has a storage modulus, G', at −20° C., of not more than 296, a storage modulus, G', at 0° C. of not more than 289.

* * * * *